(12) United States Patent
Matsubara

(10) Patent No.: US 9,261,531 B2
(45) Date of Patent: Feb. 16, 2016

(54) QUANTIFICATION METHOD AND QUANTIFICATION APPARATUS FOR ELECTRODE MATERIAL

(71) Applicant: HONDA MOTOR CO., LTD., Tokyo (JP)

(72) Inventor: Takeshi Matsubara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 100 days.

(21) Appl. No.: 14/231,751

(22) Filed: Apr. 1, 2014

(65) Prior Publication Data

US 2014/0304862 A1 Oct. 9, 2014

(30) Foreign Application Priority Data

Apr. 4, 2013 (JP) ................. 2013-078834

(51) Int. Cl.
*G01Q 30/04* (2010.01)
*G01Q 60/30* (2010.01)
*B82Y 35/00* (2011.01)

(52) U.S. Cl.
CPC ............... *G01Q 60/30* (2013.01); *G01Q 30/04* (2013.01); *B82Y 35/00* (2013.01)

(58) Field of Classification Search
CPC ....... G01Q 60/30; G01Q 60/40; G01Q 10/06; G01Q 60/00; G01Q 60/02; G01Q 60/10; G01Q 60/14; G01Q 30/04; H01L 22/14; G01N 15/1031; G01R 31/2648; G01R 27/02; G11B 9/14

See application file for complete search history.

(56) References Cited

U.S. PATENT DOCUMENTS

| 6,339,217 | B1* | 1/2002 | Kley | ...................... G01Q 60/02 850/26 |
| 2007/0157056 | A1* | 7/2007 | Haehn | ...................... H01L 22/20 714/724 |
| 2009/0100554 | A1* | 4/2009 | Arnold | ...................... G01Q 60/30 850/39 |

OTHER PUBLICATIONS

Yoshio Ukyo, "Electrode Structure and Performance of Li-ion Batteries", Functioning of powder and development of new materials with nanotechnology, 2010, pp. 21-24, The Micromeritics No. 53 2010, published by Hosokawa Micron Corporation.

* cited by examiner

*Primary Examiner* — Brooke Purinton
(74) *Attorney, Agent, or Firm* — Mori & Ward, LLP

(57) ABSTRACT

In a quantification method for an electrode material, information regarding a distribution of a material in an electrode is obtained. Information regarding a distribution of resistance in the electrode is obtained. A scatter diagram is produced based on the information regarding the distribution of the material and the information regarding the distribution of the resistance. The scatter diagram is divided into a plurality of regions. The material constituting the electrode is quantified based on the divided regions.

10 Claims, 6 Drawing Sheets

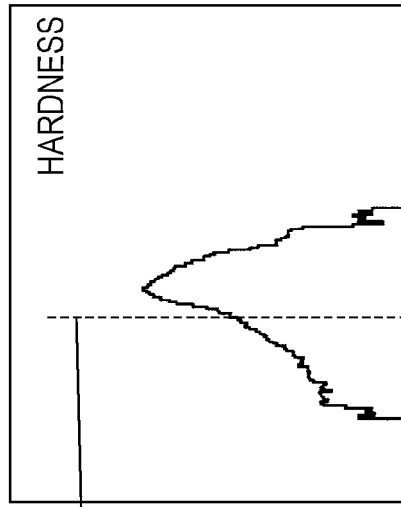
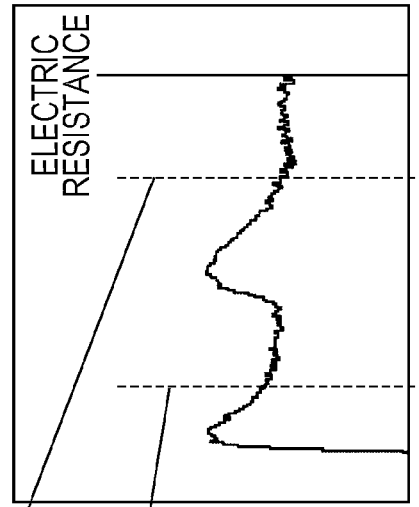
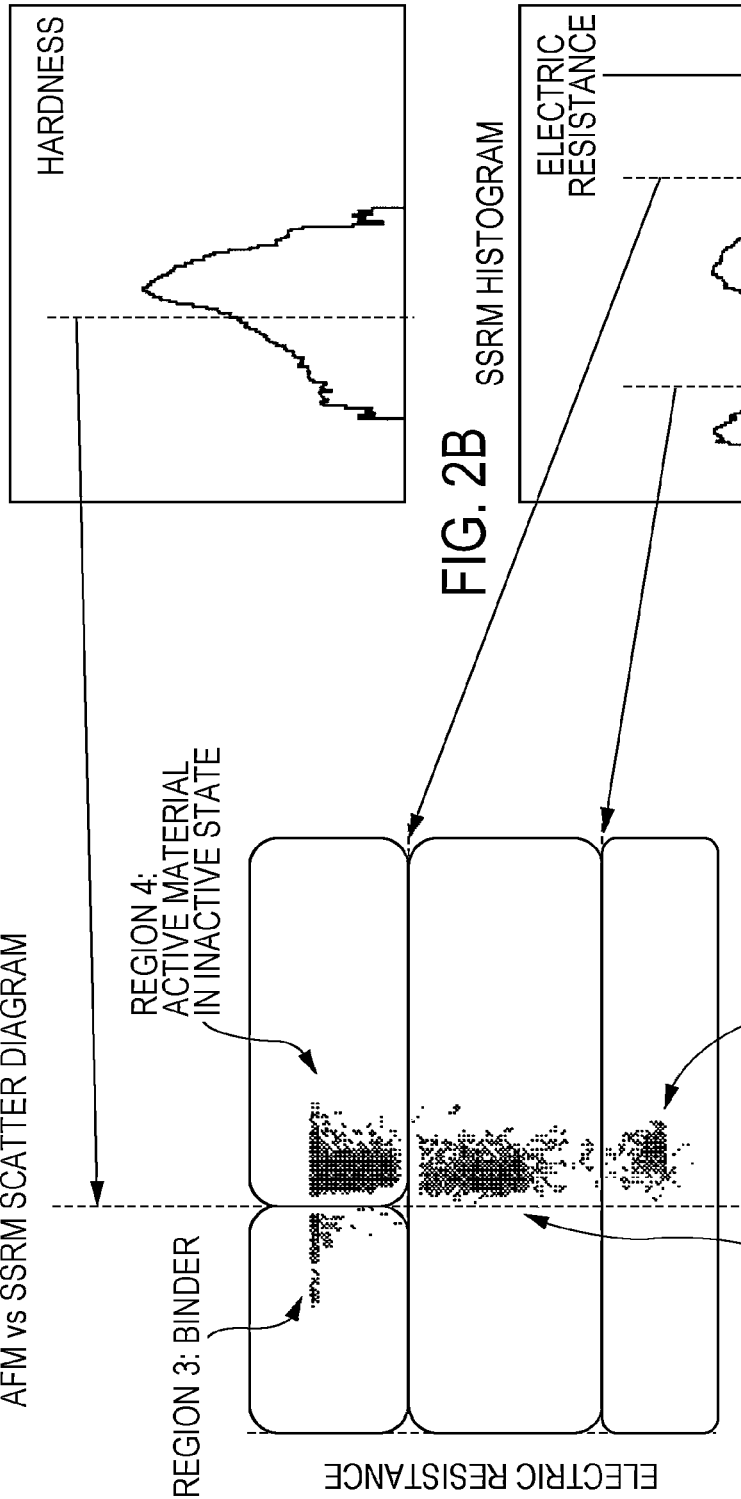

REGION 1: CONDUCTIVE ASSISTANT

REGION 2: ACTIVE MATERIAL

REGION 3: BINDER

REGION 4: ACTIVE MATERIAL IN INACTIVE STATE

REGION 1: CONDUCTIVE ASSISTANT

REGION 2: ACTIVE MATERIAL

REGION 3: BINDER

REGION 4: ACTIVE MATERIAL IN INACTIVE STATE

US 9,261,531 B2

QUANTIFICATION METHOD AND QUANTIFICATION APPARATUS FOR ELECTRODE MATERIAL

CROSS-REFERENCE TO RELATED APPLICATIONS

The present application claims priority under 35 U.S.C. §119 to Japanese Patent Application No. 2013-078834, filed Apr. 4, 2013, entitled "Quantification Method and Quantification Apparatus for Electrode Material." The contents of this application are incorporated herein by reference in their entirety.

BACKGROUND

1. Field

The present disclosure relates to a quantification method and a quantification apparatus for an electrode material.

2. Description of the Related Art

When a cycle endurance test is performed on a lithium ion battery, for example, lithium ions are inserted to an active material or are dissociated from the active material upon discharge or charge. Because the active material undergoes a large volume change at that time, cracking occurs in the surface of the active material, and fracture of the active material is caused with the progress of the cracking. This increases an amount of small active materials that are not connected to conductive paths, and reduces a battery capacity. (See "*Electrode Structure and Performance of Li-ion Batteries*" under heading "Functioning of powder and development of new materials with nanotechnology", The MICROMETRICS No. 53 2010, published by Hosokawa Micron Corporation.)

SUMMARY

According to one aspect of the present invention, in a quantification method for an electrode material, information regarding a distribution of a material in an electrode is obtained. Information regarding a distribution of resistance in the electrode is obtained. A scatter diagram is produced based on the information regarding the distribution of the material and the information regarding the distribution of the resistance. The scatter diagram is divided into a plurality of regions. The material constituting the electrode is quantified based on the divided regions.

According to another aspect of the present invention, a quantification apparatus for an electrode material includes a material distribution information obtaining device, a resistance distribution information obtaining device, a scatter diagram producing device, a dividing device, and a quantifying device. The material distribution information obtaining device is configured to obtain information regarding a distribution of a material in an electrode. The resistance distribution information obtaining device is configured to obtain information regarding a distribution of resistance in the electrode. The scatter diagram producing device is configured to produce a scatter diagram based on the information regarding the distribution of the material and the information regarding the distribution of the resistance. The dividing device is configured to divide the scatter diagram into a plurality of regions. The quantifying device is configured to quantify the material constituting the electrode based on the divided regions.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

FIG. 2A depicts an AFM (Atomic Force Microscope) histogram obtained with the SSRM apparatus, FIG. 2B depicts an SSRM histogram, and FIG. 2C depicts an AFM vs SSRM scatter diagram.

DESCRIPTION OF THE EMBODIMENTS

Figure 1:
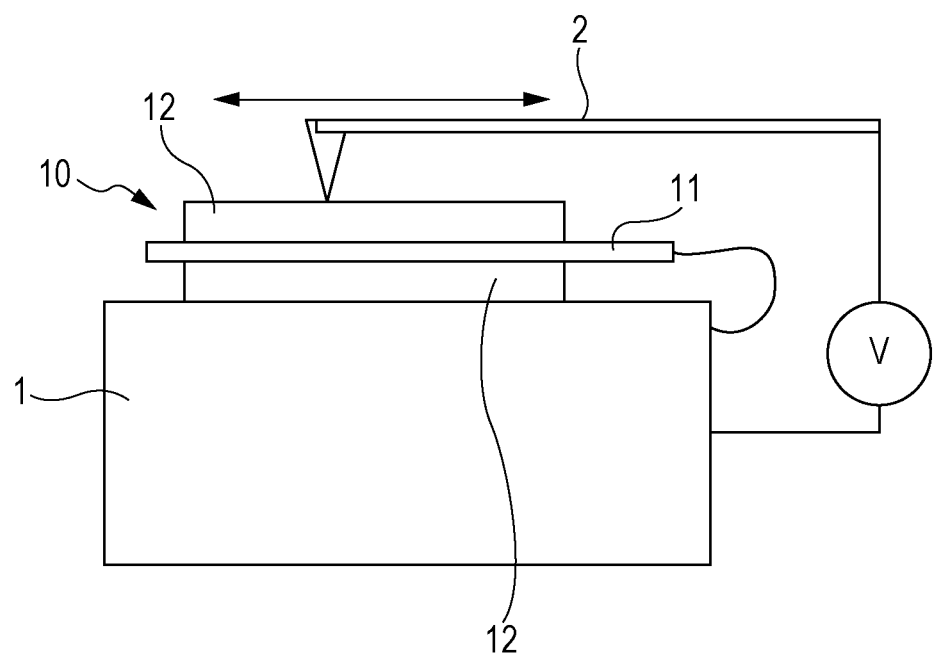
FIG. 1 is a schematic view of an SSRM (Scanning Spread Resistance Microscope) in an embodiment of the present application.

The embodiments will now be described with reference to the accompanying drawings, wherein like reference numerals designate corresponding or identical elements throughout the various drawings.

FIG. 1 is a schematic view of an SSRM (Scanning Spread Resistance Microscope) apparatus that performs measurement by employing an SSRM. In the SSRM apparatus, a positive pole 10 is placed on an upper surface of a grounded base 1, and information related to an electric resistance map for the positive pole 10 is obtained by scanning the upper surface of the positive pole 10 with a probe 2. The positive pole 10 includes a current collector 11 and an electrode material 12, which is prepared by mixing and kneading an active material, a conductive assistant, and a binder, and which is disposed on both surfaces of the current collector 11. The current collector 11 is connected to the base 1.

The SSRM apparatus further has the function of an AFM (Atomic Force Microscope). Because the surface of the positive pole 10 is mechanically polished, a soft portion is deeply polished, while a hard portion is shallowly polished. Therefore, information regarding a hardness map can be obtained by collecting information regarding a height map with scanning of the probe 2 over the surface of the positive pole 10. Of components of the electrode material 12, the active material and the conductive assistant have substantially the same hardness, whereas the binder is softer than the active material and the conductive assistant. Accordingly, the information regarding the hardness map represents material information as well.

FIG. 2A depicts an AFM histogram obtained with the SSRM apparatus, the histogram representing frequency (vertical axis) with respect to hardness (horizontal axis). FIG. 2B further depicts an SSRM histogram obtained with the SSRM apparatus, the histogram representing frequency (vertical axis) with respect to electric resistance (horizontal axis). Image information is provided in 512×512 dots, for example. FIG. 2C still further depicts an AFM vs SSRM scatter diagram obtained by synthesizing points thinned out to 64×64 dots from the AFM histogram (FIG. 2A) and the SSRM histogram (FIG. 2B), the histogram representing the hardness by the vertical axis and the electric resistance by the horizontal axis.

As seen from the AFM vs SSRM scatter diagram (FIG. 2C), the scatter diagram depicts four regions 1 to 4. The region 1 where the electric resistance is lowest corresponds to the conductive assistant. The region 3 where the hardness is lowest corresponds to the binder. The region 2 where the hardness is high and the electric resistance is low corresponds to the active material. The region 4 where the hardness is high and the electric resistance is also high corresponds to the active material in the inactive state.

The scatter diagram is divided into the regions 1 to 4, i.e., four regions corresponding to the "conductive assistant", the "active material", the "binder", and the "active material in inactive state". On the basis of the four regions thus defined, points thinned out to 64×64 dots, for example, are each tagged and mapped in accordance with AFM data (hardness data) and SSRM data (electric resistance data). More specifically, the 64×64 dots are each specified as one of the "conductive assistant", the "active material", the "binder", and the "active material in inactive state", and plotted into a map for each item. Resulting four maps corresponding to the "conductive assistant", the "active material", the "binder", and the "active material in inactive state" are processed to calculate respective areas occupied by the four regions. The division into the four regions can be executed by a method of determining the hardness and the electric resistance for each component with experiments in advance, and by grouping the measured data for division per region. As an alternative, the division into the four regions may be executed by preparing the scatter diagram (FIG. 2C), and by marking boundary lines in portions where a set of dots is discontinued. The scatter diagram (FIG. 2C) is divided by the latter method.

Figure 3A:
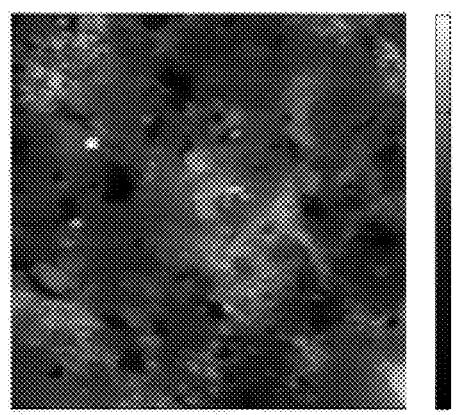
FIG. 3A is an AFM image.
Figure 3B:
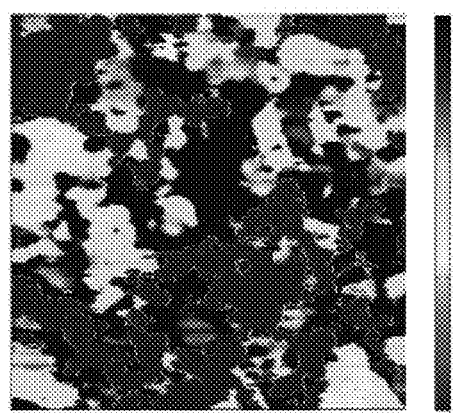
FIG. 3B is an SSRM image, both the images being obtained with the SSRM apparatus at a new positive pole.
Figure 4A:
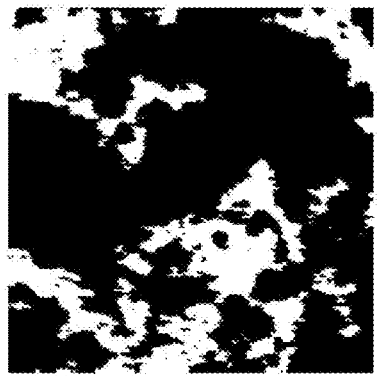
FIGS. 4A, 4B, 4C and 4D are mapped images of four regions of a "conductive assistant", a "binder", an "active material", and an "active material in inactive state".
Figure 4C:
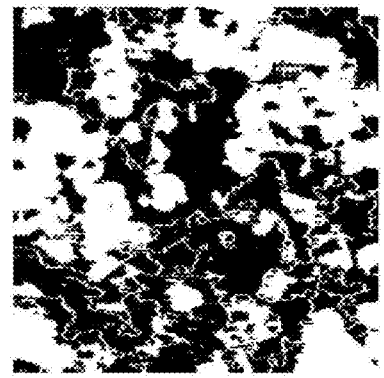
Figure 4B:
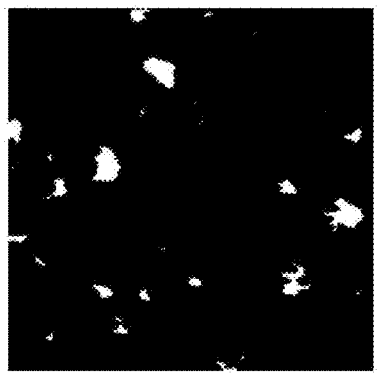
Figure 4D:
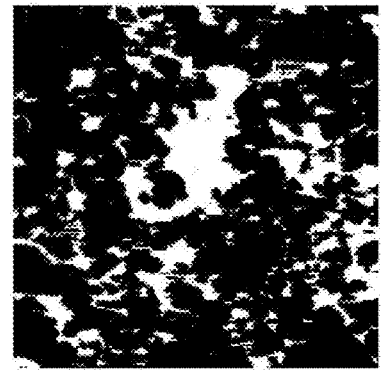
Figure 5:
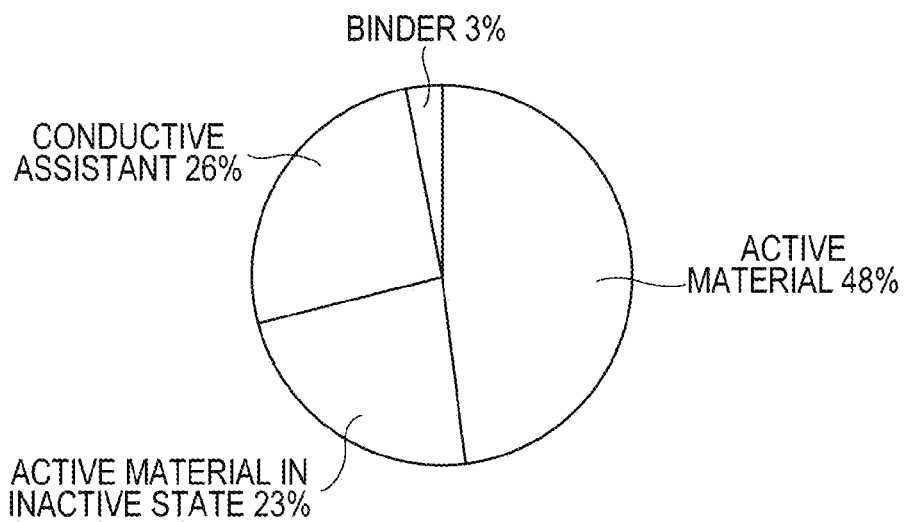
FIG. 5 is a graph representing percentages of individual materials.
Figure 6A:
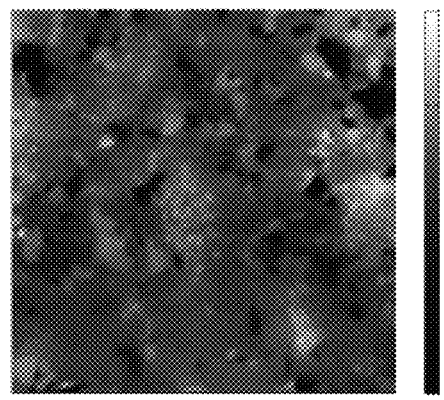
FIG. 6A is an AFM image.
Figure 6B:
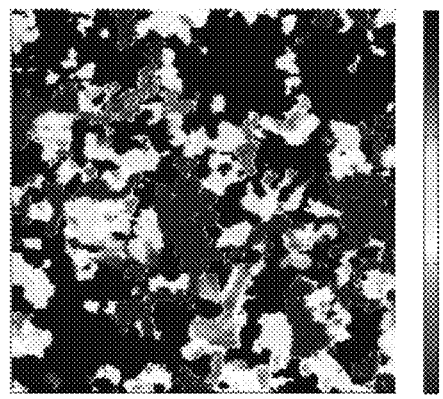
FIG. 6B is an SSRM image, both the images being obtained with the SSRM apparatus at the positive pole after a cycle test.
Figure 7A:
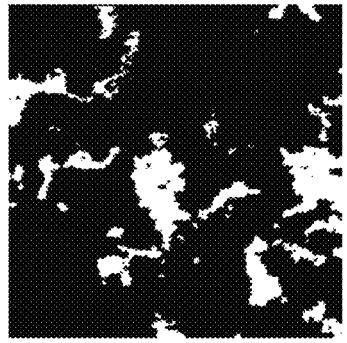
FIGS. 7A, 7B, 7C and 7D are mapped images of four regions of the "conductive assistant", the "binder", the "active material", and the "active material in inactive state".
Figure 7C:
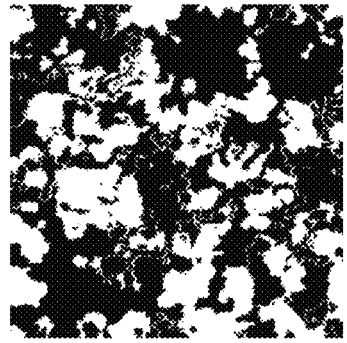
Figure 7B:
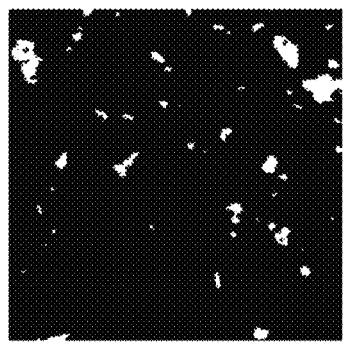
Figure 7D:
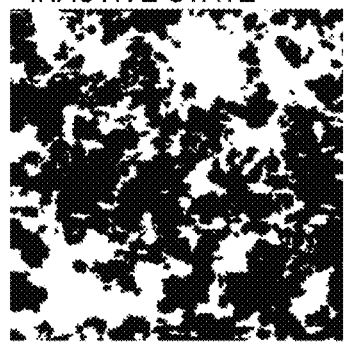

FIG. 3A is an AFM image, and FIG. 3B is an SSRM image, both images being obtained with the SSRM apparatus. If those images are as they are, it is just possible to obtain hardness information from the AFM image and electric resistance information from the SSRM image. According the present application, however, four sets of information depicted in FIGS. 4A, 4B, 4C and 4D are obtained by forming a map for each of the "conductive assistant", the "active material", the "binder", and the "active material in inactive state" based on the AFM image and the SSRM image. In each of FIGS. 4A to 4D, a white portion represents the relevant material. Information indicating respective percentages of the individual materials can be then obtained, as illustrated in FIG. 5, from the white portions contained in the sets of information depicted in FIGS. 4A to 4D.

Figure 8:
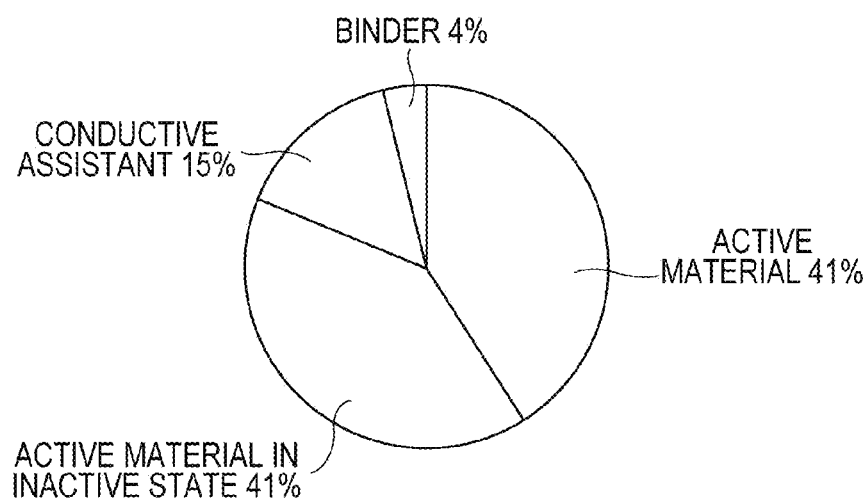
FIG. 8 is a graph representing percentages of individual materials.

FIGS. 3A and 3B, 4A to 4D, and 5 represent information obtained with a new positive pole, whereas FIGS. 6A and 6B, 7A to 7D, and 8 represent information obtained with a positive pole having deteriorated with a cycle test. In the deteriorated positive pole, as illustrated in FIG. 8, the percentage of the active material decreases, and the percentage of the active material in the inactive state increases. In accordance with such a change in the measurement result, a relation between the load applied in the cycle test of, e.g., the lithium-ion secondary battery and the deterioration (reduction of capacity) can be analyzed quantitatively. Moreover, even for a new electrode, a percentage of the active material that is not effectively working can be quantified. Accordingly, the present application is further effective, for example, in optimizing respective proportions of the conductive assistant and other components, and in improving production conditions.

The present application can be applied, for example, to quantitatively analyze the capacity of a positive pole in a secondary battery, e.g., a lithium-ion secondary battery.

The quantification method for the electrode material includes the steps of obtaining information regarding a distribution of a material of an electrode, obtaining information regarding a distribution of resistance of the electrode, preparing a scatter diagram from the information regarding the distribution of the material and the information regarding the distribution of the resistance, dividing the scatter diagram into a plurality of regions, and quantifying the material of the electrode based on the divided regions.

Preferably, the material of the electrode is an active material that greatly affects the lifetime of a secondary battery, for example. The active material preferably has a resistance value in a first state of the active material and a higher resistance value in a second state of the active material than the resistance value in the first state of the active material. According to this feature, the active material in the second state, i.e., in a deactivated (inactive) state, can be qualified. In other words, the active material deactivated into the inactive state can be qualified which is the cause of reducing the capacity of the secondary battery.

The quantification apparatus for the electrode material includes a unit that obtains information regarding a distribution of a material of an electrode, a unit that obtains information regarding a distribution of resistance of the electrode, a unit that prepares a scatter diagram from the information regarding the distribution of the material and the information regarding the distribution of the resistance, a unit that divides the scatter diagram into a plurality of regions, and a unit that quantifies the material of the electrode based on the divided regions.

According to the present application, a target material can be quantified from the divided regions of the scatter diagram.

Obviously, numerous modifications and variations of the present invention are possible in light of the above teachings. It is therefore to be understood that within the scope of the appended claims, the invention may be practiced otherwise than as specifically described herein.

What is claimed is:

1. A quantification method for an electrode material, the quantification method comprising:
   obtaining information regarding a distribution of a material in an electrode using a scanning probe microscope;
   obtaining information regarding a distribution of resistance in the electrode using the scanning probe microscope;
   producing a scatter diagram based on the information regarding the distribution of the material and the information regarding the distribution of the resistance;
   dividing the scatter diagram into a plurality of regions; and
   quantifying the material constituting the electrode based on the divided regions.

2. The quantification method for the electrode material according to claim 1, wherein the material constituting the electrode is an active material, and the active material has a resistance value in a first state of the active material and a higher resistance value in a second state of the active material than the resistance value in the first state of the active material.

3. The quantification method for the electrode material according to claim 1, wherein the information regarding the distribution of the material in the electrode is based on information regarding a hardness map for the electrode, and the information regarding the distribution of resistance in the electrode is based on information regarding an electric resistance map for the electrode.

4. The quantification method for the electrode material according to claim 1, wherein the plurality of regions include a region of a conductive assistant, a region of an active material, a region of a binder, and a region of an active material in inactive state.

5. The quantification method for the electrode material according to claim 1, wherein the scanning probe microscope is a scanning spread resistance microscope.

6. A quantification apparatus for an electrode material, the quantification apparatus comprising:
- a scanning probe microscope configured to obtain information regarding a distribution of a material in an electrode, the scanning probe microscope being further configured to obtain information regarding a distribution of resistance in the electrode;
- a scatter diagram producing device configured to produce a scatter diagram based on the information regarding the distribution of the material and the information regarding the distribution of the resistance;
- a dividing device configured to divide the scatter diagram into a plurality of regions; and
- a quantifying device configured to quantify the material constituting the electrode based on the divided regions.

7. The quantification apparatus for the electrode material according to claim 6, wherein the information regarding the distribution of the material in the electrode is based on information regarding a hardness map for the electrode, and the information regarding the distribution of resistance in the electrode is based on information regarding an electric resistance map for the electrode.

8. The quantification apparatus for the electrode material according to claim 6, wherein the plurality of regions include a region of a conductive assistant, a region of an active material, a region of a binder, and a region of an active material in inactive state.

9. The quantification apparatus for the electrode material according to claim 6, wherein the scanning probe microscope is a scanning spread resistance microscope.

10. A quantification apparatus for an electrode material, the quantification apparatus comprising:
- material distribution information obtaining means for obtaining information regarding a distribution of a material in an electrode;
- resistance distribution information obtaining means for obtaining information regarding a distribution of resistance in the electrode;
- scatter diagram producing means for producing a scatter diagram based on the information regarding the distribution of the material and the information regarding the distribution of the resistance;
- dividing means for dividing the scatter diagram into a plurality of regions; and
- quantifying means for quantifying the material constituting the electrode based on the divided regions.

* * * * *